United States Patent
Nakamura et al.

(10) Patent No.: US 9,965,144 B2
(45) Date of Patent: May 8, 2018

(54) INFORMATION PROCESSING APPARATUS AND METHOD, AND NON-TRANSITORY COMPUTER READABLE MEDIUM

(71) Applicant: FUJI XEROX CO., LTD., Minato-ku, Tokyo (JP)

(72) Inventors: Shinichi Nakamura, Yokohama (JP); Nozomi Noguchi, Yokohama (JP); Hideaki Sugimoto, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 703 days.

(21) Appl. No.: 14/288,596

(22) Filed: May 28, 2014

(65) Prior Publication Data

US 2015/0026639 A1    Jan. 22, 2015

(30) Foreign Application Priority Data

Jul. 19, 2013    (JP) .................................. 2013-150814

(51) Int. Cl.
   *G06F 3/0481*    (2013.01)
   *G06F 3/0484*    (2013.01)
   *G06F 3/0486*    (2013.01)

(52) U.S. Cl.
   CPC ........ *G06F 3/04817* (2013.01); *G06F 3/0486* (2013.01); *G06F 3/04842* (2013.01)

(58) Field of Classification Search
   CPC .................... G06F 3/04817; G06F 3/04842
   See application file for complete search history.

(56) References Cited

U.S. PATENT DOCUMENTS 6,121,960 A * 9/2000 Carroll .................. G06F 1/1626
                                                        345/169
6,330,007 B1 * 12/2001 Isreal .................... G06F 3/0481
                                                        715/207

(Continued)

FOREIGN PATENT DOCUMENTS

JP         11327721 A    11/1999
JP      2006-099733 A     4/2006

(Continued)

OTHER PUBLICATIONS

Communication dated Nov. 25, 2014 from the Japanese Patent Office in counterpart application No. 2014-109251.

(Continued)

*Primary Examiner* — William Bashore
*Assistant Examiner* — Nathan Shrewsbury
(74) *Attorney, Agent, or Firm* — Sughrue Mion, PLLC

(57) ABSTRACT

An information processing apparatus includes an image display unit, an arrangement unit, and a marker display unit. The image display unit displays images. Upon acceptance of an instruction to rearrange an image selected from among the images in an arrangement area including one of the images, the arrangement unit rearranges the selected image at a rearrangement position in the arrangement area on the image display unit. The marker display unit displays a marker image between an image at the rearrangement position and an image arranged lower in rank than the image at the rearrangement position when the rearrangement position is lower than the position of the selected image, or displays the marker image between the image at the rearrangement position and an image arranged higher in rank than the image at the rearrangement position when the rearrangement position is higher than the position of the selected image.

16 Claims, 14 Drawing Sheets

(56) References Cited

U.S. PATENT DOCUMENTS

| | | | |
|---|---|---|---|
| 8,423,890 B2 | 4/2013 | Oda | |
| 8,928,700 B1* | 1/2015 | Khafizova | G06F 3/04883 345/661 |
| 9,229,624 B2* | 1/2016 | Wei | G06F 3/04842 |
| 2006/0048069 A1 | 3/2006 | Igeta | |
| 2007/0016872 A1* | 1/2007 | Cummins | G06F 3/0486 715/769 |
| 2009/0031235 A1* | 1/2009 | Martin | G03G 15/502 715/765 |
| 2009/0089694 A1* | 4/2009 | Mori | A63F 13/10 715/764 |
| 2009/0307623 A1* | 12/2009 | Agarawala | G06F 3/0483 715/765 |
| 2010/0045705 A1* | 2/2010 | Vertegaal | A47G 19/2227 345/661 |
| 2010/0070931 A1* | 3/2010 | Nichols | G06F 3/0488 715/863 |
| 2010/0110012 A1* | 5/2010 | Maw | G06F 1/1616 345/169 |
| 2010/0295805 A1* | 11/2010 | Shin | G06F 3/04883 345/173 |
| 2011/0078624 A1* | 3/2011 | Missig | G06F 3/04883 715/802 |
| 2011/0093778 A1* | 4/2011 | Kim | G06F 3/041 715/702 |
| 2011/0134126 A1* | 6/2011 | Miyazaki | G06F 3/04883 345/428 |
| 2011/0138328 A1* | 6/2011 | Ge | G06F 3/0482 715/811 |
| 2011/0219297 A1 | 9/2011 | Oda | |
| 2011/0252375 A1* | 10/2011 | Chaudhri | G06F 3/04817 715/835 |
| 2012/0147049 A1 | 6/2012 | Lee | |
| 2012/0176401 A1* | 7/2012 | Hayward | G06T 3/0093 345/619 |
| 2012/0235912 A1* | 9/2012 | Laubach | G06F 3/04895 345/163 |
| 2013/0044141 A1* | 2/2013 | Markiewicz | G06F 3/0485 345/684 |
| 2013/0050119 A1 | 2/2013 | Nemoto | |
| 2013/0091411 A1* | 4/2013 | Rampson | G06F 3/0237 715/224 |
| 2013/0113717 A1* | 5/2013 | Van Eerd | G06F 3/04883 345/173 |
| 2013/0117698 A1* | 5/2013 | Park | G06F 3/04817 715/765 |
| 2013/0120278 A1* | 5/2013 | Cantrell | G06F 3/04886 345/173 |
| 2013/0120292 A1* | 5/2013 | Gwak | G06F 3/0416 345/173 |
| 2013/0135234 A1* | 5/2013 | Hisano | G06F 3/017 345/173 |
| 2013/0139102 A1* | 5/2013 | Miura | G06F 3/04817 715/788 |
| 2013/0346913 A1* | 12/2013 | Smith | G06F 3/04883 715/784 |
| 2014/0007011 A1* | 1/2014 | Allen | G06F 3/04817 715/833 |
| 2014/0013271 A1* | 1/2014 | Moore | G06F 3/0482 715/792 |
| 2014/0075332 A1* | 3/2014 | Jeon | H04M 1/72552 715/752 |
| 2014/0108978 A1* | 4/2014 | Yu | G06F 3/0482 715/765 |
| 2014/0108979 A1* | 4/2014 | Davidson | G06F 3/0481 715/765 |
| 2014/0203999 A1* | 7/2014 | Shim | G06F 3/1454 345/2.2 |
| 2014/0300560 A1* | 10/2014 | An | G06F 3/0488 345/173 |
| 2014/0304631 A1* | 10/2014 | Wang | G06F 3/0488 715/765 |
| 2014/0337786 A1* | 11/2014 | Luo | G06F 3/0416 715/773 |
| 2015/0035800 A1* | 2/2015 | Uchiyama | G06F 3/0421 345/175 |
| 2015/0074504 A1* | 3/2015 | Steinfl | G06F 3/0482 715/202 |
| 2015/0227236 A1* | 8/2015 | Lee | G06F 3/013 345/174 |
| 2015/0370779 A1* | 12/2015 | Dixon | G06F 3/04883 715/261 |
| 2016/0062573 A1* | 3/2016 | Dascola | G06F 3/0482 715/810 |
| 2016/0062644 A1* | 3/2016 | Adams | G06F 3/04886 715/763 |
| 2016/0070407 A1* | 3/2016 | Jeon | G06F 1/1626 345/173 |
| 2016/0349970 A1* | 12/2016 | Everitt | G06F 17/212 |
| 2016/0364138 A1* | 12/2016 | Luo | G06F 3/04886 |

FOREIGN PATENT DOCUMENTS

| | | |
|---|---|---|
| JP | 2008097435 A | 4/2008 |
| JP | 2011-048835 A | 3/2011 |
| JP | 2011-186742 A | 9/2011 |
| JP | 201253662 A | 3/2012 |
| JP | 201258979 A | 3/2012 |
| JP | 201274810 A | 4/2012 |
| JP | 2012230537 A | 11/2012 |
| JP | 2013-065294 A | 4/2013 |
| JP | 2014505932 A | 3/2014 |
| WO | 2012077986 A2 | 6/2012 |

OTHER PUBLICATIONS

Communication dated Jan. 10, 2018 from the State Intellectual Property Office of the P.R.C. in counterpart Chinese application No. 201410323024.0.

\* cited by examiner

INFORMATION PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-150814 filed Jul. 19, 2013.

BACKGROUND (i) Technical Field

The present invention relates to an information processing apparatus and method, and a non-transitory computer readable medium.

(ii) Related Art

In information processing apparatuses such as tablet terminals and personal computers, images, called "icons", are often arranged on a screen, each of which is associated with certain software and represents the details of that software in a diagram or a picture in an easy-to-understand manner. A user performs an operation to specify this image using an input device, thereby activating the software associated with this image.

In Windows (registered trademark), which is a general operating system for personal computers, for example, images each associated with certain software are arranged in order on a screen, thereby causing a user to visually recognize software when using the software and making it easy for the user to select one from among the images.

In many cases, a user is capable of moving a specific image among these images on a screen and rearranging it at the user's desired position by performing an input operation, which is so-called "drag and drop", for example. In the case where the images are automatically arranged in descending order at arrangement positions that are ranked and arranged in order, if a user tries to rearrange an image at a position at which another image is arranged, the position where the rearrangement operation is performed and a position at which the image is actually arranged may be different in some cases.

For example, as illustrated in FIG. 22, consider a screen on which images A to G are arranged, each of which is associated with certain software (S91). In the case where a user wishes to move and rearrange the image F, the user performs a drag operation to move the image F over the image C (S92) and gives a rearrangement instruction with a drop operation, and the image F may be moved not to the position where the image C has been arranged, but to the position where the image D has been arranged (S93). It is considered that, as illustrated in FIG. 23, in order to arrange the image F to the position where the image C has been arranged, it is necessary to arrange the image F between the images B and C. To do so, it is necessary for the user to perform a drop operation in an area including the space between the images B and C, such as that illustrated by an arrangement area 901. However, such an operation in image rearrangement sometimes ends in a result different from what is intended by the user.

SUMMARY

According to an aspect of the invention, there is provided an information processing apparatus including an image display unit, an arrangement unit, and a marker display unit. The image display unit displays multiple images. Upon acceptance of an instruction given from an instruction unit to rearrange an image selected from among the multiple images in an arrangement area including one of the multiple images, the arrangement unit rearranges the selected image at a rearrangement position arranged in the arrangement area on the image display unit. The marker display unit displays a marker image between an image at the rearrangement position and an image arranged lower in rank than the image at the rearrangement position in a case where the rearrangement position is lower in rank than the position of the selected image, or displays the marker image between the image at the rearrangement position and an image arranged higher in rank than the image at the rearrangement position in a case where the rearrangement position is higher in rank than the position of the selected image.

BRIEF DESCRIPTION OF THE DRAWINGS

An exemplary embodiment of the present invention will be described in detail based on the following figures, wherein.

DETAILED DESCRIPTION

Figure 1:
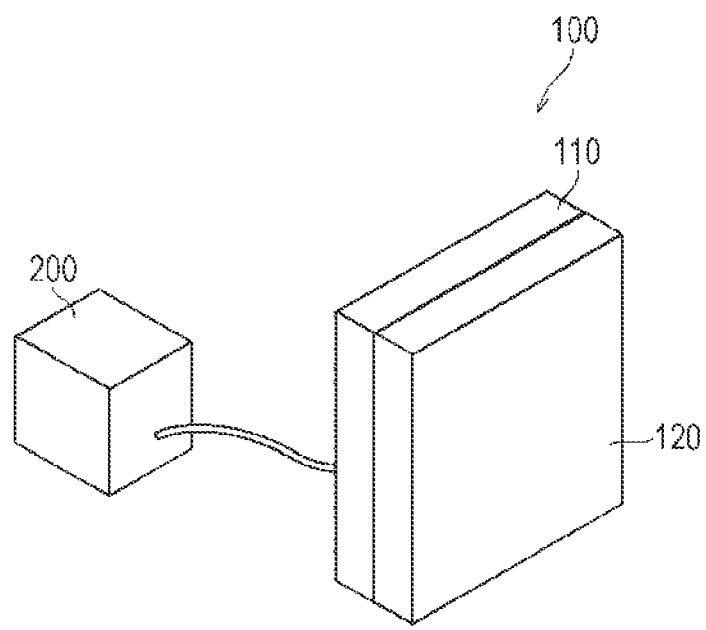
FIG. 1 is a diagram illustrating an information processing system according to an exemplary embodiment of the invention.

FIG. 1 illustrates an information processing system 100 according to an exemplary embodiment of the invention. As illustrated in this diagram, the information processing system 100 includes an information processing apparatus 200, a display device 110, and a touch panel 120. The information processing apparatus 200 includes a central processing unit (CPU), a random-access memory (RAM), a magnetic disk device, and the like. The information processing apparatus 200 processes digital information. The display device 110, such as a liquid crystal display, displays image information output from the information processing apparatus 200. The touch panel 120 includes a transparent substrate superimposed on a display face of the display device 110, wiring including a transparent electrode formed on the transparent substrate, and the like. Being touched with a finger of a user, for example, the touch panel 120 detects the touched coordinates and outputs the coordinates to the information processing apparatus 200.

Although the display device 110 is described here as being a liquid crystal display or the like, the display device 110 may be any display device that displays an image, such as an organic electro-luminescence (EL) display device. In addition, although the touch panel 120 serves as an input device, a mouse, a keyboard, or any other input device may be used. In addition, although the information processing apparatus 200 is configured to be directly connected to the display device 110 and the touch panel 120, the information processing apparatus 200 may be one that functions as a server apparatus or the like on a network such as the Internet. In this case, image information displayed on the display device 110, input information, and so forth may be transmitted/received via an information communication terminal that is not illustrated in FIG. 1. In this case, the information processing apparatus 200 may be configured of multiple devices connected to a network.

Figure 2:
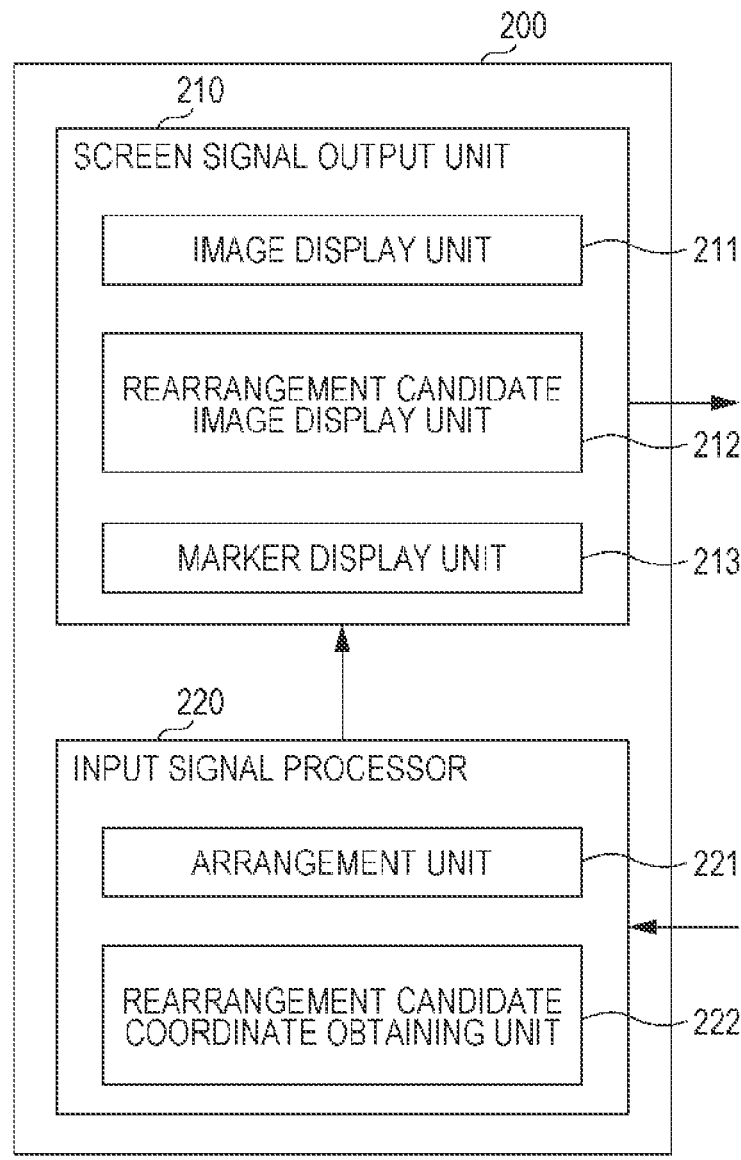
FIG. 2 is a block diagram illustrating the functional configuration of an information processing apparatus illustrated in FIG. 1.

FIG. 2 is a block diagram illustrating the functional configuration of the information processing apparatus 200. As illustrated in this diagram, the information processing apparatus 200 includes a screen signal output unit 210 and an input signal processor 220. The screen signal output unit 210 outputs a screen signal that is a signal to be displayed on the screen of the display device 110. The input signal processor 220 receives the coordinates input at the touch panel 120, processes information on the basis of the screen displayed and the coordinates input at the screen signal output unit 210, and gives a screen output instruction to the screen signal output unit 210. Note that these functions are realized by executing, by the CPU, a program saved in a storage device such as a magnetic disk storage device of the information processing apparatus 200. Here, the program may alternatively be stored in another storage medium such as a compact-disc read-only memory (CD-ROM) and provided.

Here, the screen signal output unit 210 includes an image display unit 211, a rearrangement candidate image display unit 212, and a marker display unit 213. The image display unit 211 displays multiple types of images, which are generally called "icons", arranged at arrangement positions that are ranked and arranged in order on the screen, and associated with software, and which represent the details of programs in diagrams or pictures in an easy-to-understand manner. In the case of searching for a rearrangement candidate position of an image in response to a drag operation or the like, the rearrangement candidate image display unit 212 displays a rearrangement candidate image that is a semitransparent image, for example, at a rearrangement candidate position indicated by a drag operation or the like. In the case where a rearrangement instruction is given by a drop operation or the like, the marker display unit 213 displays a marker image that serves as a marker between two adjacent images between which the rearranged image will be sandwiched.

In addition, the input signal processor 220 includes an arrangement unit 221, and a rearrangement candidate coordinate obtaining unit 222. Upon reception of a rearrangement instruction from the input device such as the touch panel 120 at coordinates in each arrangement area including one image arranged at a respective arrangement position, the arrangement unit 221 determines an arrangement position that belongs to the arrangement area as a rearrangement position, and instructs the image display unit 211 to rearrange the image at the rearrangement position. In the case of searching for a rearrangement candidate position of an image in response to a drag operation or the like, the rearrangement candidate coordinate obtaining unit 222 receives drag-operated coordinates on the screen from the input device such as the touch panel 120, and notifies the rearrangement candidate image display unit 212 of the coordinates.

FIGS. 3 to 21 are diagrams each illustrating a screen displayed on the display device 110 illustrated in FIG. 1 or transition of screens. These screens are, for example, start screens for starting the use of each function of the information processing apparatus 200, and images that are multiple types of images associated with software are sequentially arranged at arrangement positions that are ranked and arranged in order. By specifying each image, its associated software is activated.

Figure 3:
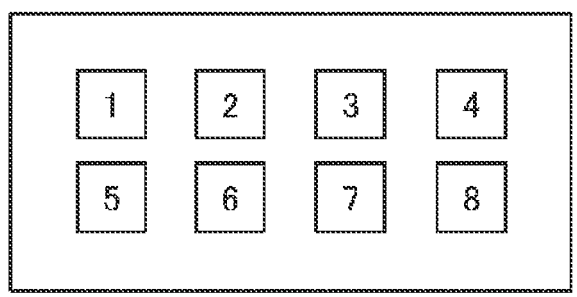
FIG. 3 is a diagram illustrating images' arrangement positions that are ranked on a screen.

FIG. 3 is a diagram illustrating images' arrangement positions that are ranked on the screen according to the exemplary embodiment. Numerals illustrated in the diagram indicate the ranks of the individual arrangement positions. The images have arrangement positions that are ranked in a horizontal direction.

Figure 4:
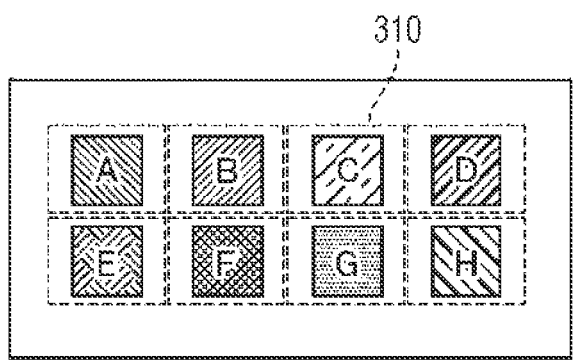
FIG. 4 is a diagram illustrating images arranged at the arrangement positions illustrated in FIG. 3, and arrangement areas of the arrangement positions.

FIG. 4 is a diagram illustrating images A to H arranged at the arrangement positions illustrated in FIG. 3, and an arrangement area 310 of each arrangement position. Here, each arrangement area 310 is an area that includes one image arranged at a corresponding arrangement position and is illustrated by broken lines. In an operation performed by a so-called drag and drop operation to rearrange an image, if an arrangement instruction is given by a drop operation in one arrangement area 310 illustrated by broken lines, the arrangement unit 221 instructs the image display unit 211 to rearrange that image at a rearrangement position associated with that rearrangement area 310.

Figure 5:
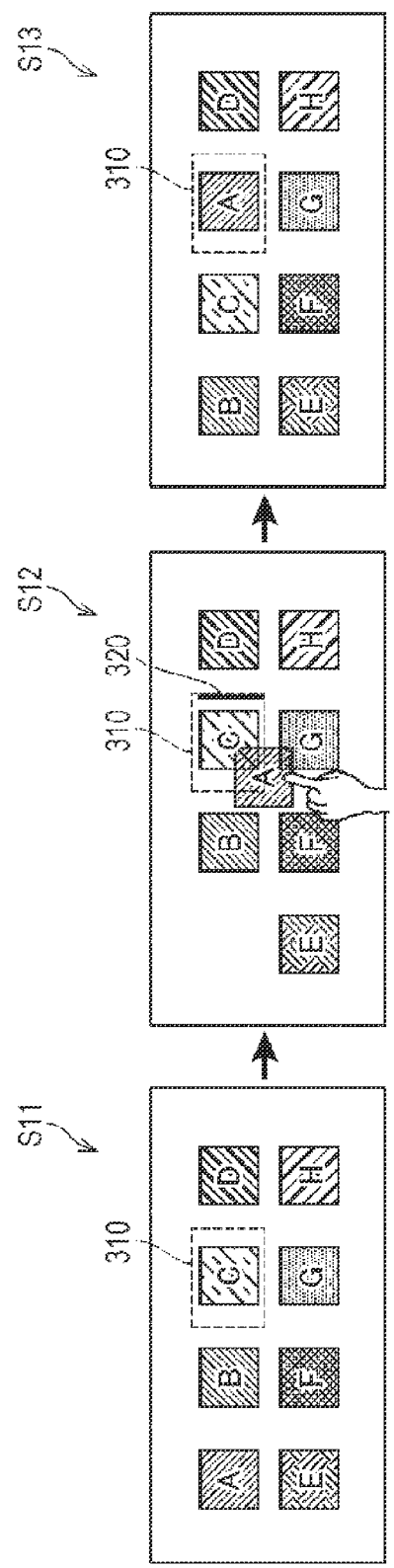
FIG. 5 is a flowchart illustrating the manner in which an image is rearranged from a higher rank to a lower rank in the arrangement positions.

FIG. 5 is a flowchart illustrating the manner in which an image is rearranged from a higher rank to a lower rank in the arrangement positions. Before being moved to rearrangement positions, the images A to I are arranged at the same positions as FIG. 4 (S11). Here, for example, in the case of rearranging the image A at the arrangement position of the image C, which is lower in rank than the arrangement position of the image A, the image A is moved by a drag operation to the arrangement area 310 including the image C (S12). In this drag operation, the rearrangement candidate coordinate obtaining unit 222 obtains the coordinates being moved from the touch panel 120, and the rearrangement candidate image display unit 212 displays, as a candidate position for a position at which the coordinates reported from the rearrangement candidate coordinate obtaining unit 222 are to be rearranged, a rearrangement candidate image that is a semi-transparent image of the image A at the coordinates of the candidate position. In the case where this candidate position is a first rearrangement position, such as the arrangement position of the image C, which is an arrangement position lower in rank than the arrangement position prior to the rearrangement, the marker display unit 213 displays a marker image 320 between the image C and the image D, which is arranged at an arrangement position adjacent to the lower rank side of the image C (S12). This indicates that, if a rearrangement instruction is given by a drop operation at the candidate position, the image A will be arranged between the images C and D.

Here, in the case where an arrangement instruction is given by a drop operation or the like in the arrangement area 310 of the image C, the arrangement unit 221 determines to arrange the image A at the arrangement position where the image C has been arranged, which is associated with the arrangement area 310, notifies the image display unit 211 thereof, and notifies the image display unit 211 of movement of the images B and C, which are arranged between an arrangement position lower in rank than the arrangement position prior to the rearrangement and the rearrangement position (first rearrangement position), to rearrangement positions higher in rank by one. Accordingly, the image display unit 211 displays, on the display device 110, a screen on which the image A is rearranged at the position where the image C has been arranged and the images B and C are moved to arrangement positions higher in rank by one (S13).

Figure 6:
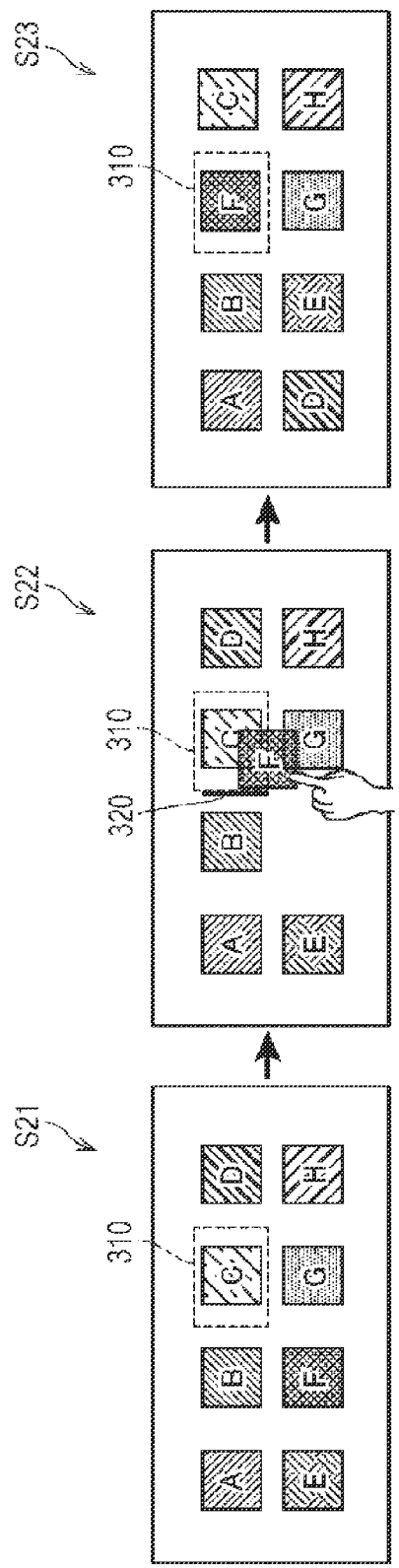
FIG. 6 is a flowchart illustrating the manner in which an image is rearranged from a lower rank to a higher rank in the arrangement positions.

FIG. 6 is a flowchart illustrating the manner in which an image is rearranged from a lower rank to a higher rank in the arrangement positions. The images A to H are arranged at the same positions as FIG. 5 (S21). Here, for example, in the case of rearranging the image F at the arrangement position (second rearrangement position) of the image C, which is higher in rank than the arrangement position of the image F, the image F is moved by a drag operation to the arrangement area 310 including the image C (S22). In this drag operation, as with the case illustrated in FIG. 5, the rearrangement candidate coordinate obtaining unit 222 obtains the coordinates being moved from the touch panel 120, and the rearrangement candidate image display unit 212 displays a rearrangement candidate image that is a semi-transparent image of the image F at a candidate position. Since this candidate position is the second rearrangement position, which is the arrangement position of the image C higher in rank than the arrangement position prior to the rearrangement, the marker display unit 213 displays the marker image 320 between the image C and the image B, which is arranged at an arrangement position adjacent to the higher rank side of the image C. This indicates that, if a rearrangement instruction is given by a drop operation at the candidate position, the image F will be arranged between the images B and C.

Here, in the case where an arrangement instruction is given by a drop operation or the like in the arrangement area 310 of the image C, the arrangement unit 221 determines to arrange the image F at the arrangement position where the image C has been arranged, which is associated with the arrangement area 310, notifies the image display unit 211 thereof, and notifies the image display unit 211 of movement of the images C, D, and E, which are arranged between an arrangement position higher in rank than the arrangement position prior to the rearrangement and the rearrangement position (second rearrangement position), to rearrangement positions lower in rank by one. Accordingly, the image display unit 211 displays, on the display device 110, a screen on which the image F is rearranged at the position where the image C has been arranged, and the images C, D, and E are moved to arrangement positions lower in rank by one (S23).

As illustrated in FIGS. 5 and 6, according to the exemplary embodiment, an arrangement area associated with one arrangement position is an arrangement area including the area of an image, and an arrangement position associated with an arrangement area included in coordinates at which a rearrangement instruction is given by a drop operation or the like is a rearrangement position. Therefore, the difference between a position where an image is instructed to be rearranged and a position where the image is rearranged may be minimized, thereby rearranging the image at an arrangement position intended by the user.

In addition, in the case of the first rearrangement position, an image(s) arranged between an arrangement position lower in rank than the arrangement position prior to the rearrangement and the first rearrangement position is/are moved to an arrangement position(s) higher in rank by one. In the case of the second rearrangement position, an image(s) arranged between an arrangement position higher in rank than the arrangement position prior to the rearrangement and the second rearrangement position is/are moved to an arrangement position(s) lower in rank by one. Therefore, the image is rearranged at an arrangement position intended by the user, while the other images are arranged in order.

In addition, particularly in arrangement areas associated with the first rearrangement position, an image may be rearranged at the first rearrangement position even in first arrangement areas that are arrangement areas higher in rank than the center of an arrangement position (such as the higher rank side of each image). In arrangement areas associated with the second rearrangement position, an image may be rearranged at the second rearrangement position even in second arrangement areas that are arrangement areas lower in rank than the middle one of the arrangement positions (such as the lower rank side of each image).

Figure 7:
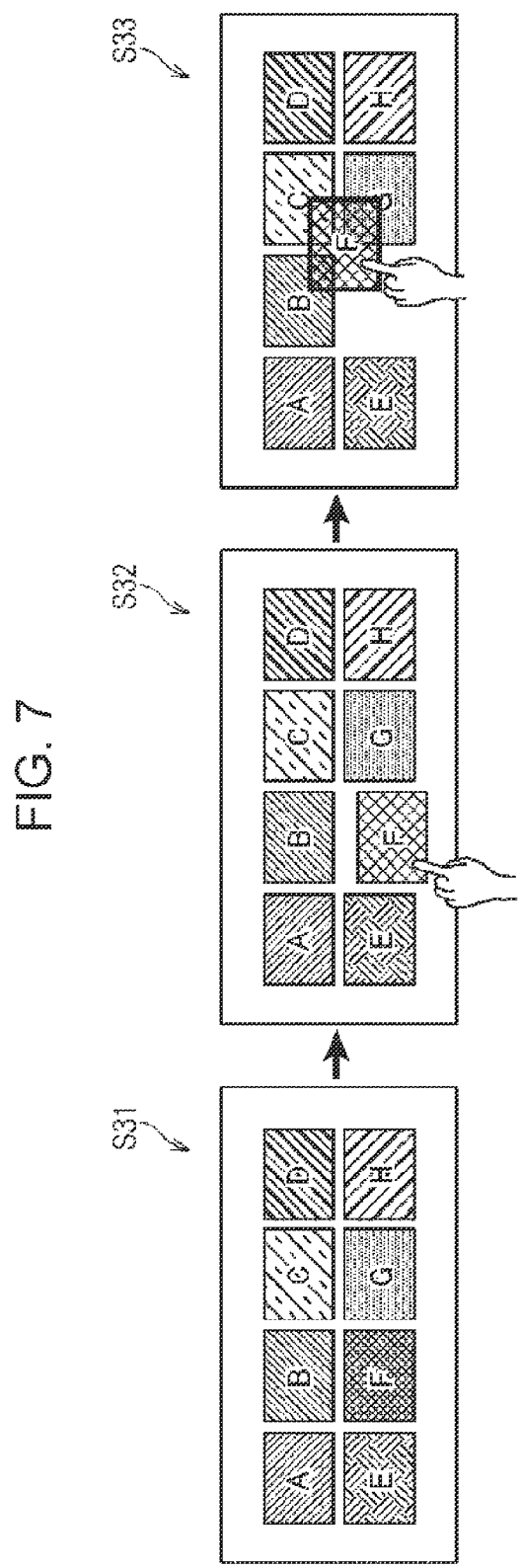
FIG. 7 is a flowchart for describing a rearrangement candidate image displayed by a rearrangement candidate image display unit.

FIG. 7 is a flowchart for describing a rearrangement candidate image displayed by the rearrangement candidate image display unit 212. As illustrated in this diagram, among the images arranged as in FIG. 4 (S31), the image F is moved by a drag operation, and the rearrangement candidate image display unit 212 displays a rearrangement candidate image that is a semitransparent image of the image F at the coordinates reported from the rearrangement candidate coordinate obtaining unit 222 (S32). Further, in the case where the image F is moved to a position overlapping another image, the rearrangement candidate image display unit 212 displays a rearrangement candidate image with a border framing the exterior of the semitransparent image (S33). In the diagram, an already framed image is further framed with a thicker border in step S33, thereby indicating that a border is added. Alternatively, the image F may not be framed in advance, and, only when the image F is placed over another arranged image and is displayed as a rearrangement candidate image, the rearrangement candidate image may be framed with a border and displayed. The same applies to FIGS. 8 and 9. By performing such display, while the images such as those arranged on the screen are being viewed, the visual impression of an image being moved may be maintained, and, even when this image overlaps another image arranged on the screen, this image may be distinctively displayed. Here, the color of a border is not limited to black; the color of a border may be changed to an appropriate color in accordance with the background or the like.

Figure 8:
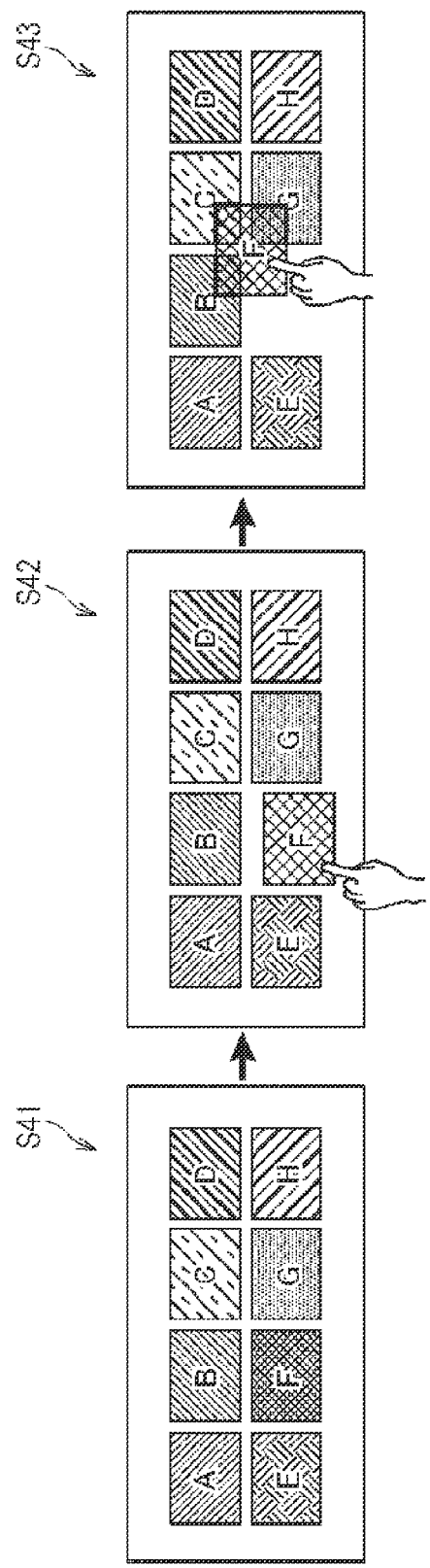
FIG. 8 is a flowchart illustrating another example of the rearrangement candidate image displayed by the rearrangement candidate image display unit.

FIG. 8 is a flowchart illustrating another example of the rearrangement candidate image displayed by the rearrangement candidate image display unit 212. Since steps S41 and S42 in this flowchart are the same as steps S31 and S32 illustrated in FIG. 7, descriptions thereof are omitted. As indicated in step S43 of this flowchart, in the case of displaying the rearrangement candidate image which overlaps other arranged images, the rearrangement candidate image display unit 212 displays a border only at a portion overlapping these other images. By performing such display, while the images such as those arranged on the screen are being viewed, the visual impression of an image being moved may be maintained. In addition, even when this image overlaps other images arranged on the screen, this image may be more distinctively displayed.

Figure 9:
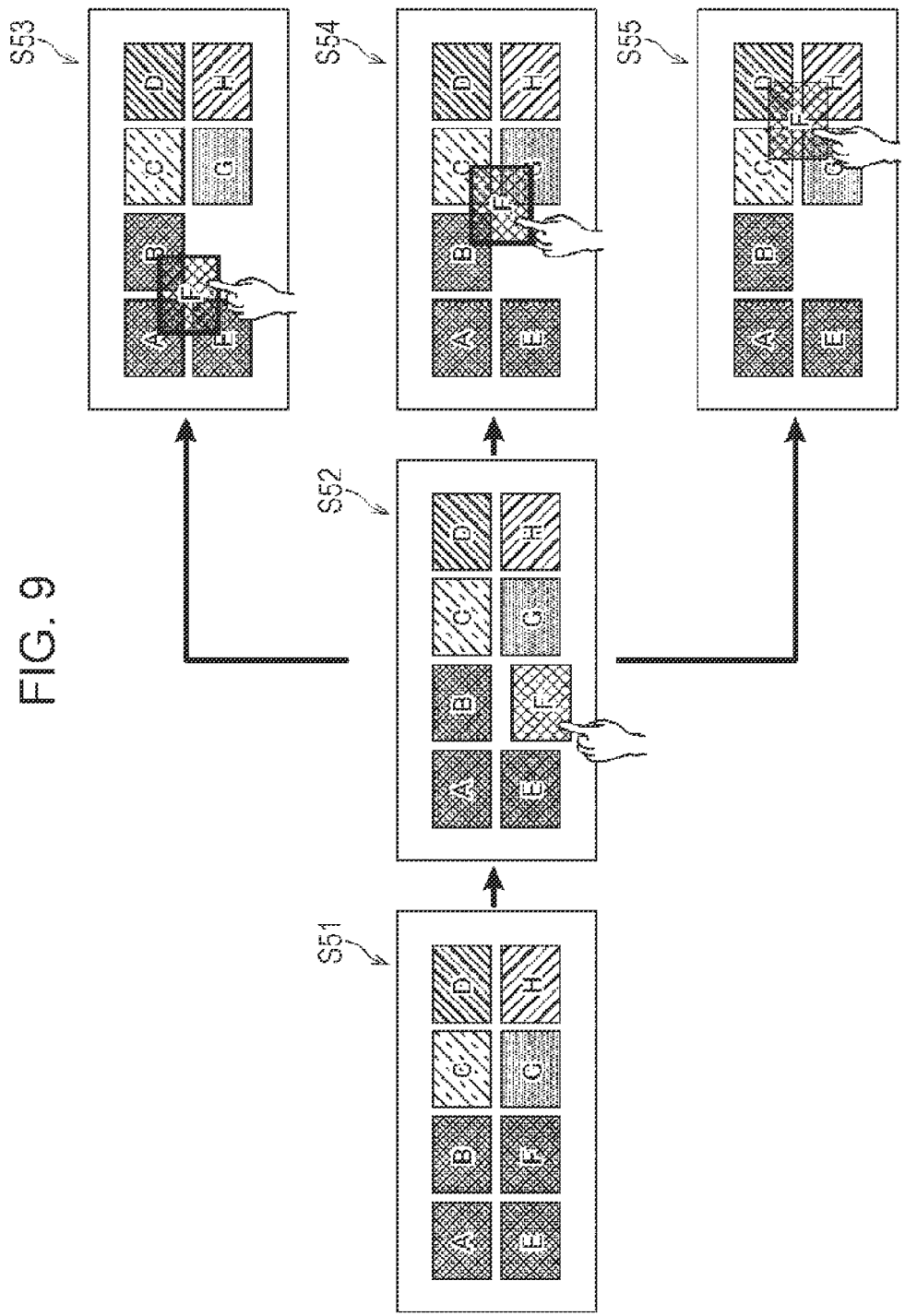
FIG. 9 is a flowchart illustrating another example of the rearrangement candidate image displayed by the rearrangement candidate image display unit.

FIG. 9 is a flowchart illustrating another example of the rearrangement candidate image displayed by the rearrangement candidate image display unit 212. Since steps S51 and S52 in this flowchart are the same as steps S31 and S32 illustrated in FIG. 7, descriptions thereof are omitted. As indicated in steps S53 to S55 of this flowchart, when the rearrangement candidate image overlaps one or more images in a similar color, namely, any of the images A, B, and E (S53 and S54), a border is displayed; otherwise, no border is displayed (S55). By performing such display, while the images such as those arranged on the screen are being viewed, the visual impression of an image being moved may be maintained. In addition, even when this image overlaps other images arranged on the screen, this image may be more distinctively displayed.

Figure 10:
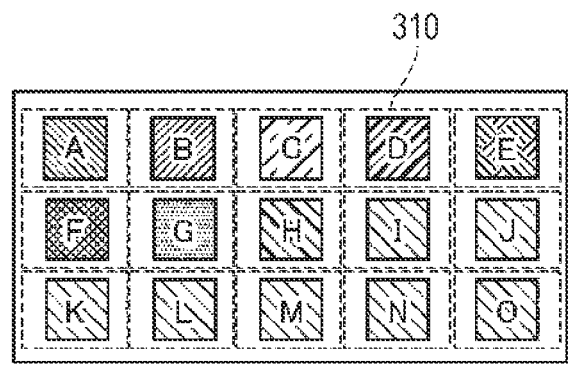
FIG. 10 is a diagram illustrating another exemplary screen on which images are arranged, and the images' arrangement areas.
Figure 11:
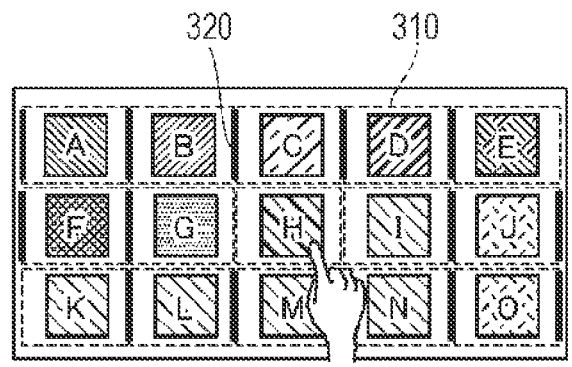
FIG. 11 is a diagram illustrating a screen on which the images are arranged according to a first modification of the exemplary embodiment.
Figure 12:
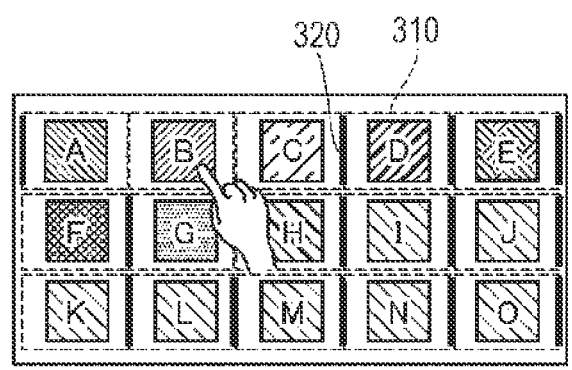
FIG. 12 is a diagram illustrating marker images displayed by a marker display unit on the screen illustrated in FIG. 10.

FIG. 10 is a diagram illustrating a screen on which images are arranged according to a first modification of the exemplary embodiment. As illustrated in this diagram, images A to O are arranged over five columns and three rows. FIG. 11 is a diagram illustrating the marker image 320 displayed by the marker display unit 213 in the case where the image B is moved to each arrangement area by a drag operation on the screen illustrated in FIG. 10. FIG. 12 is a diagram illustrating the marker image 320 displayed by the marker display unit 213 in the case where the image H is moved to each arrangement area by a drag operation on the screen illustrated in FIG. 10.

As illustrated in these diagrams, in the case where the arrangement position to be rearranged is the first rearrangement position, which is an arrangement position lower in rank than the arrangement position prior to the rearrangement, the marker display unit 213 displays the marker image 320 between an image arranged at the first rearrangement position and an image arranged at an arrangement position adjacent to the lower rank side of the first rearrangement position. In the case where the arrangement position to be rearranged is the second rearrangement position, which is an arrangement position higher in rank than the arrangement position prior to the rearrangement, the marker display unit 213 displays the marker image 320 between an image arranged at the second rearrangement position and an image arranged at an arrangement position adjacent to the higher rank side of the second rearrangement position. Therefore, prior to giving a rearrangement instruction, the user confirms the displayed marker image 320 and then gives a rearrangement instruction. If so, the user is able to visually recognize between which images an image to be rearranged will be rearranged. In addition, the marker image 320 may be displayed at a position where the difference between a position where an image is instructed to be rearranged and a position where the image is rearranged is minimized.

Figure 13:
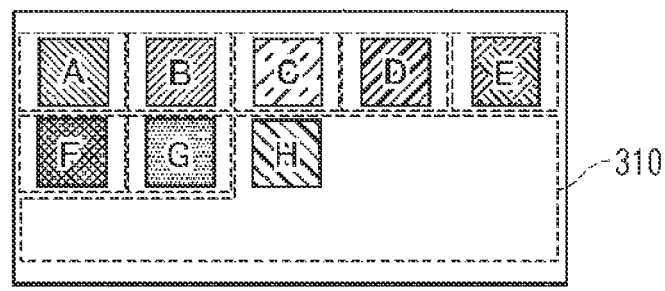
FIG. 13 is a diagram illustrating an example of a screen on which the arrangement areas are displayed in the case where images are not arranged on the entire screen.

FIG. 13 is a diagram illustrating the case where images are not arranged on the entire screen in the first modification illustrated in FIG. 10. As illustrated in this diagram, the screen includes the images A to H, and the images A to H are not arranged over the entire screen. In such a case, for example, it is assumed that the arrangement area 310 of the image H arranged at the lowest-rank arrangement position includes an area where no image is displayed. If an instruction to arrange an image is given by a drop operation or the like in this area, the image may be rearranged at the arrangement position of the image H. By defining the arrangement area 310 in this way, even when an instruction to arrange an image is given in any area within the screen, the image may be rearranged at an arrangement position associated with the arrangement area.

Figure 14:
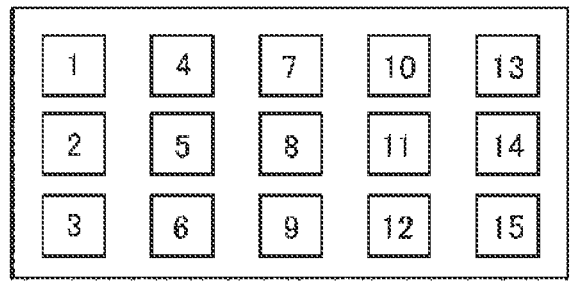
FIG. 14 is a diagram illustrating images' arrangement positions that are ranked according to a second modification of the exemplary embodiment.

FIG. 14 is a diagram illustrating images' arrangement positions that are ranked according to a second modification of the exemplary embodiment. Numerals illustrated in the diagram indicate the ranks of the individual arrangement positions. As illustrated in this diagram, the images have arrangement positions that are ranked in a vertical direction.

Figure 15:
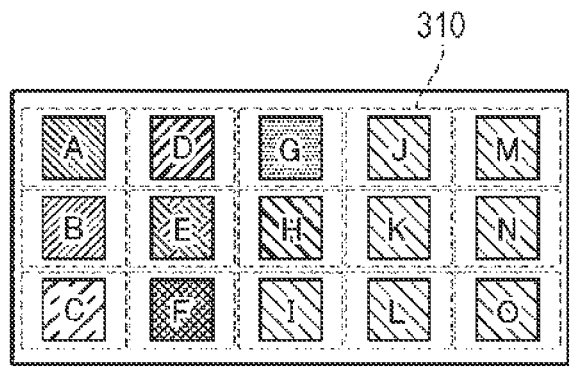
FIG. 15 is a diagram illustrating the arrangement areas of images displayed at the arrangement positions illustrated in FIG. 14.

FIG. 15 is a diagram illustrating the images A to O arranged at the arrangement positions illustrated in FIG. 14, and the arrangement area 310 of each arrangement position. Here, each arrangement area 310 is an area including an image arranged at a respective arrangement position, which is indicated by broken lines in the diagram.

Figure 16:
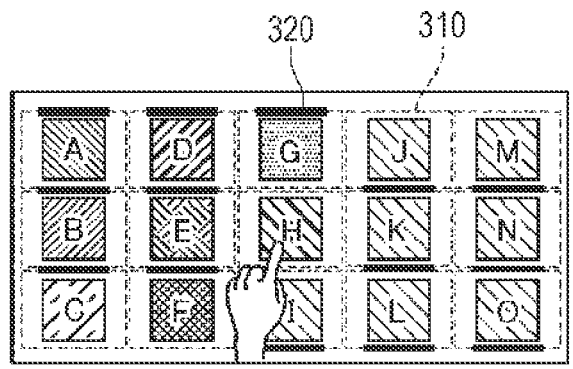
FIG. 16 is a diagram illustrating marker images displayed by the marker display unit on the screen illustrated in FIG. 15.
Figure 17:
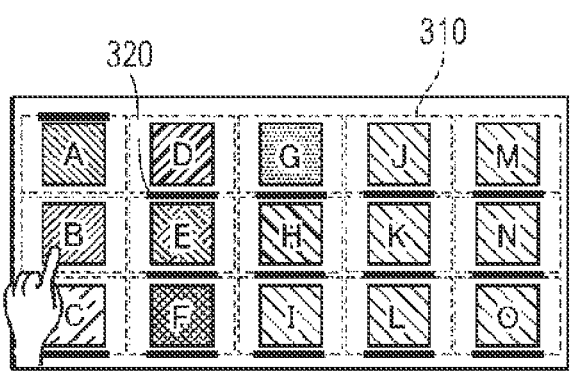
FIG. 17 is a diagram illustrating marker images displayed by the marker display unit on the screen illustrated in FIG. 15.

FIG. 16 is a diagram illustrating the marker image 320 displayed by the marker display unit 213 on the screen illustrated in FIG. 15 in the case where the image H is moved to each arrangement area by a drag operation. FIG. 17 is a diagram illustrating the marker image 320 displayed by the marker display unit 213 on the screen illustrated in FIG. 15 in the case where the image B is moved to each arrangement area by a drag operation. Even in these cases, as with the cases illustrated in FIGS. 10 to 12, the marker display unit 213 displays the marker image 320 between an image arranged at the first rearrangement position and an image arranged at an arrangement position adjacent to the lower rank side of the first rearrangement position, and displays the marker image 320 between an image arranged at the second rearrangement position and an image arranged at an arrangement position adjacent to the higher rank side of the second rearrangement position. Therefore, the same effects as those in the cases illustrated in FIGS. 10 to 12 may be achieved.

Figure 18:
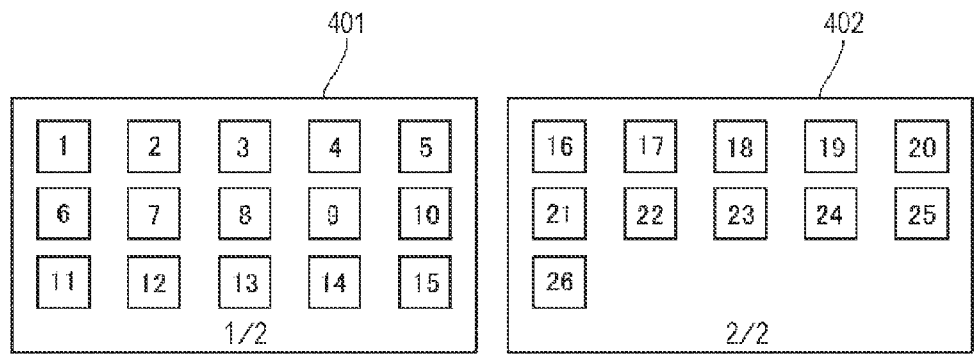
FIG. 18 is a diagram illustrating an example in which images are arranged over two screens according to a third modification of the exemplary embodiment.

FIG. 18 is a diagram illustrating an example in which images are arranged over two screens according to a third modification of the exemplary embodiment. In this example, arrangement positions are ranked and arranged in order in a horizontal direction. As illustrated in this diagram, ranking is continuous over two screens, namely, a first screen 401 and a second screen 402.

Figure 19:
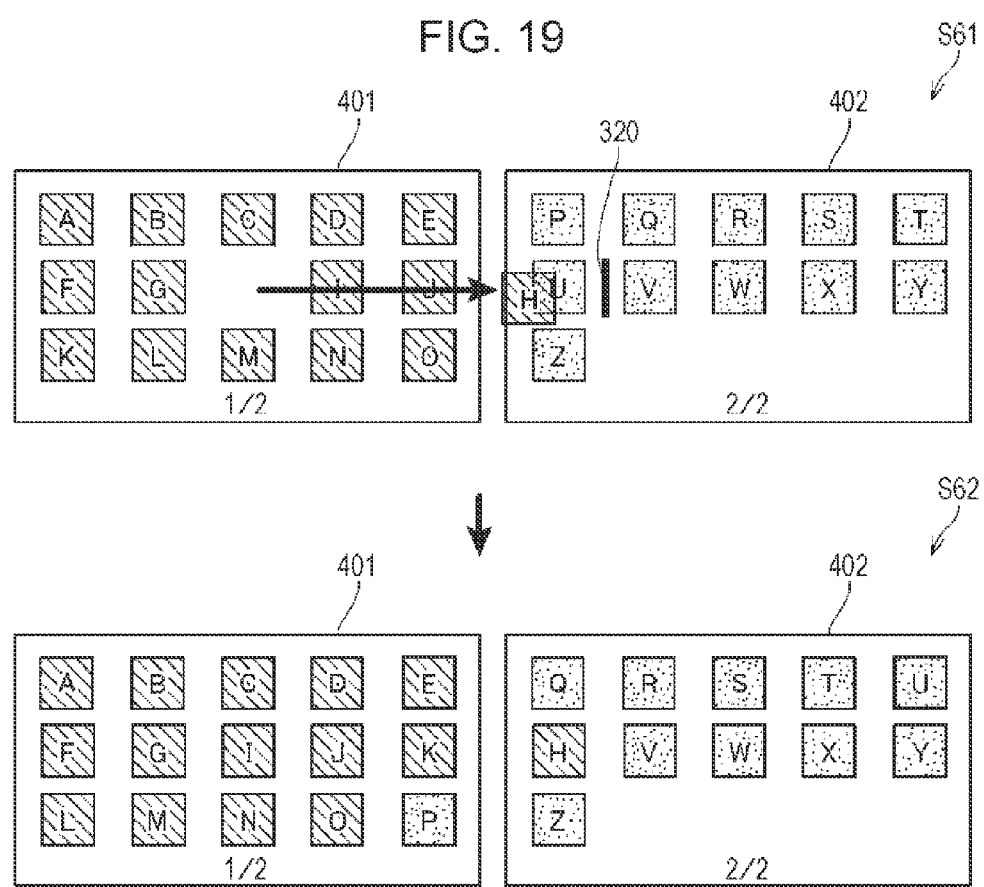
FIG. 19 is a diagram illustrating an example in which an image on a first screen illustrated in FIG. 18 is rearranged on a second screen.

FIG. 19 is a diagram illustrating an example in which, among images A to Z arranged at the arrangement positions illustrated in FIG. 18, the image H on the first screen 401 is rearranged at the position of the image U on the second screen 402. As illustrated in this flowchart, the image H is moved by a drag operation to the right end of the first screen 401, thereby changing over to the second screen 402. On the second screen 402, when an arrangement instruction is given by a drop operation or the like in the arrangement area 310 of the image U (S61), the arrangement unit 221 determines to rearrange the image H at the arrangement position of the image U, which is the first rearrangement position, as with the example illustrated in FIG. 5, and notifies the image display unit 211 thereof. In addition, the arrangement unit 221 notifies the image display unit 211 of movement of images arranged between an arrangement position lower in rank than the arrangement position prior to the rearrangement and the first rearrangement position, namely, the images I to U, to arrangement positions higher in rank by one. The image display unit 211, which is notified by the arrangement unit 221, displays the first screen 401 or the second screen 402 with the rearranged images A to Z (S62). Although the case in which rearrangement is performed from the higher-rank first screen 401 to the arrangement position on the lower-rank second screen 402 has been illustrated in FIG. 19, the case in which rearrangement is performed from the lower-rank second screen 402 to the arrangement position on the higher-rank first screen 401 is the same as the example illustrated in FIG. 6. Therefore, even when an image moves between two screens, the difference from a position where the image is rearranged may be minimized, and the image may be rearranged at an arrangement position intended by the user.

Figure 20:
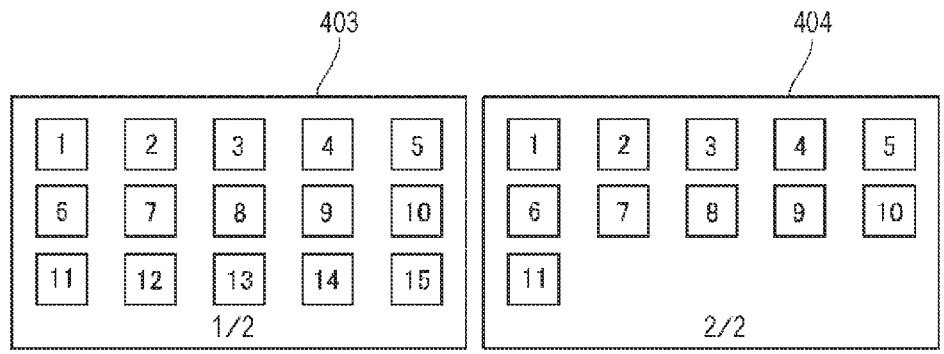
FIG. 20 is a diagram illustrating another example in which images are arranged over two screens according to a fourth modification of the exemplary embodiment.

FIG. 20 is a diagram illustrating another example in which images are arranged over two screens according to a fourth modification of the exemplary embodiment. In this example, arrangement positions are ranked and arranged in order in a horizontal direction, as in FIG. 18. However, ranking is independent in each of two screens, namely, a first screen 403 and a second screen 404, and ranking starts from one on each screen.

Figure 21:
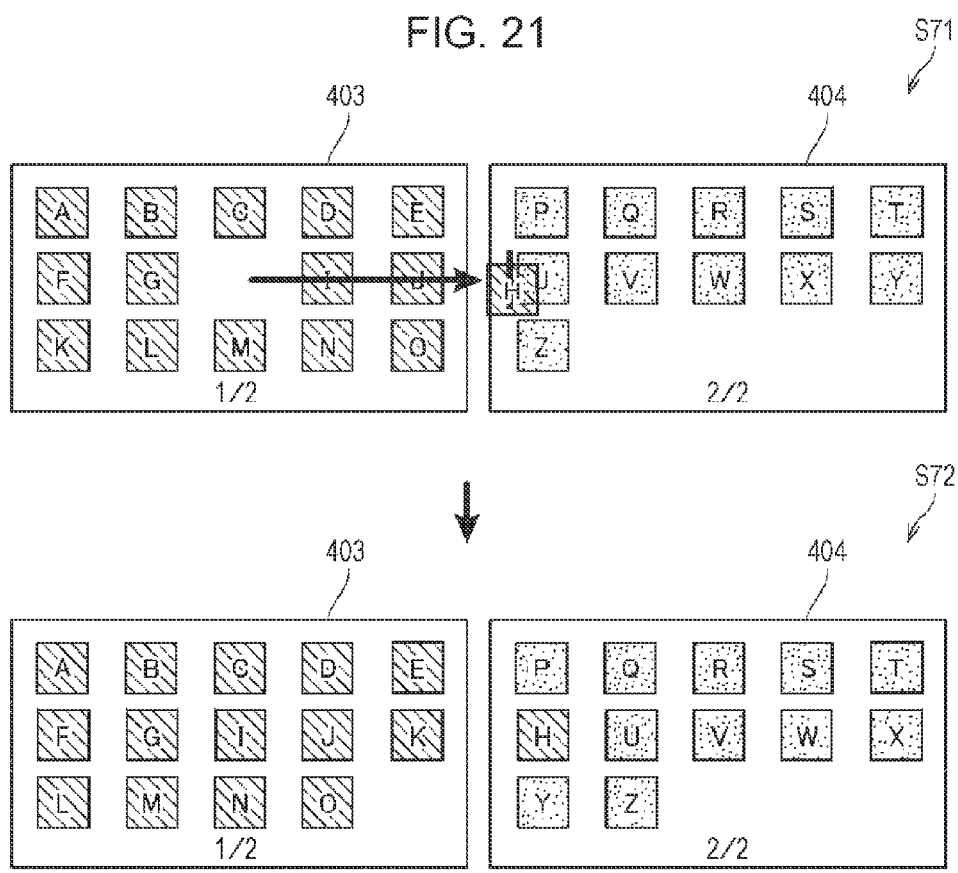
FIG. 21 is a diagram illustrating an example in which an image on a first screen illustrated in FIG. 20 is rearranged on a second screen.
Figure 22:
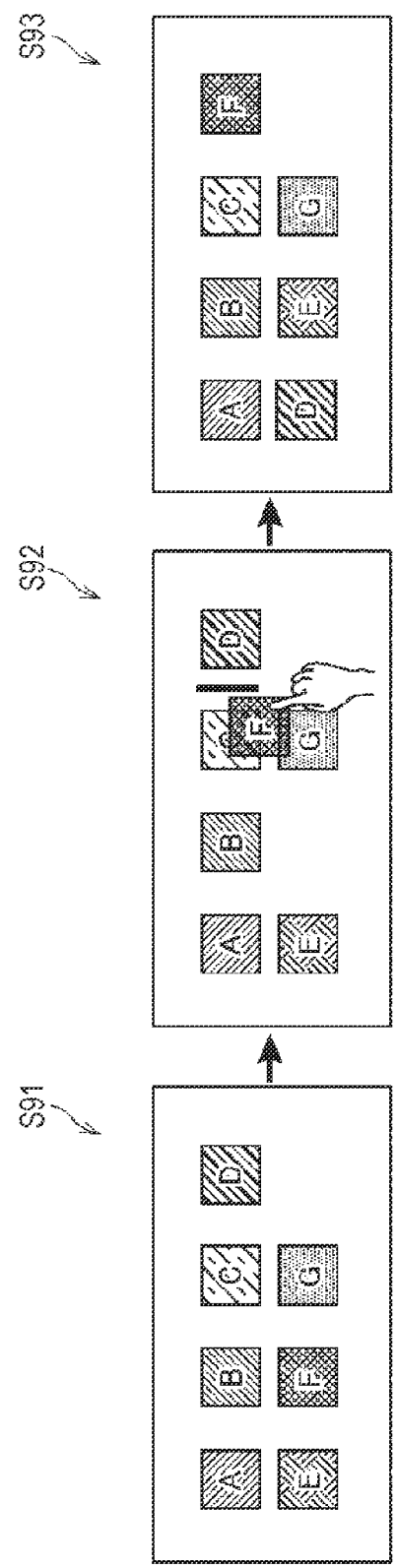
FIG. 22 is a flowchart for describing technology of the related art.
Figure 23:
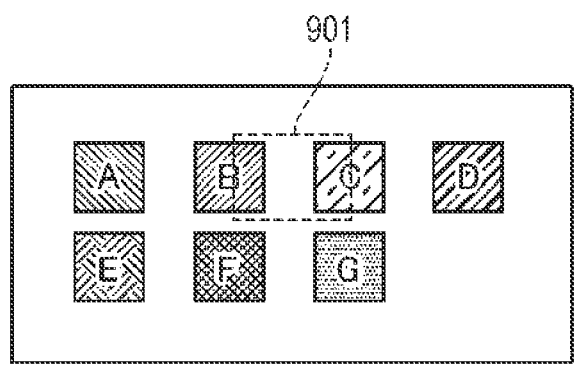
FIG. 23 is a diagram for describing technology of the related art.

FIG. 21 is a diagram illustrating an example in which, among the images A to Z arranged as in FIG. 20, the image H on the first screen 403 is rearranged at the position of the image U on the second screen 404. As illustrated in this flowchart, as in FIG. 19, the image H is moved by a drag operation to the right end of the first screen 403, thereby changing over to the second screen 404. On the second screen 404, when an arrangement instruction is given by a drop operation or the like in the arrangement area 310 of the image U (S71), the arrangement unit 221 determines to rearrange the image H at the arrangement position of the image U, and notifies the image display unit 211 thereof. In addition, the arrangement unit 221 notifies the image display unit 211 of movement of the images I to O on the first screen 403, which are arranged at arrangement positions lower in rank than the arrangement position prior to the rearrangement, to arrangement positions higher in rank by one. In addition, because the arrangement position where the image H is rearranged is the second rearrangement position on the second screen 404, the arrangement unit 221 notifies the image display unit 211 of movement of the image U at the arrangement position to be rearranged and the images V to Z, which are arranged at arrangement positions lower in rank than the arrangement position to be rearranged, to arrangement positions lower in rank by one. The image display unit 211, which is notified by the arrangement unit 221, displays the first screen 403 or the second screen 404 with the rearranged images A to Z (S72).

Although the case in which rearrangement is performed from the first screen 403 to the arrangement position on the second screen 404 has been illustrated in FIG. 21, the same applies to the case in which rearrangement is performed from the second screen 404 to the arrangement position on the first screen 403. Therefore, even when an image moves between two screens, the difference from a position where the image is rearranged may be minimized, and the image may be rearranged at an arrangement position intended by the user.

Although the case in which the images are arranged over two screens is discussed in the above-described modes illustrated in FIGS. 18 to 21, the number of screens is not limited to two, and the images may be arranged over multiple screens including three or more screens.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an image display unit configured to display a plurality of images;
an arrangement unit configured to, upon acceptance of an instruction given from an instruction unit to rearrange an image selected from among the plurality of images in an arrangement area including one of the plurality of images, rearrange the selected image at a rearrangement position arranged in the arrangement area on the image display unit; and
a marker display unit configured to display, separately from the selected image, a marker image between an image at the rearrangement position and an image arranged lower in rank than the image at the rearrangement position in a case where the rearrangement position is lower in rank than the position of the selected image, or display, separately from the selected image, the marker image between the image at the rearrangement position and an image arranged higher in rank than the image at the rearrangement position in a case where the rearrangement position is higher in rank than the position of the selected image.

2. The information processing apparatus according to claim 1, wherein, in a case where the rearrangement position is higher in rank than the position of the selected image, the arrangement unit is further configured to instruct the image display unit to move an image arranged between an arrangement position higher in rank than the arrangement position of the selected image prior to the rearrangement and the rearrangement position to an arrangement position lower in rank by one.

3. The information processing apparatus according to claim 1, wherein, in a case where the rearrangement position is lower in rank than the position of the selected image, the arrangement unit is further configured to instruct the image display unit to move an image arranged between an arrangement position lower in rank than the arrangement position of the selected image prior to the rearrangement and the rearrangement position to an arrangement position higher in rank by one.

4. The information processing apparatus according to claim 1,
wherein the positions which are ranked are present over a plurality of screens,
wherein, in a case where the rearrangement position is on a screen different from a screen on which the arrangement position of the selected image prior to the rearrangement is present, the arrangement unit is further configured to instruct the image display unit to move an image arranged at an arrangement position lower in rank than the arrangement position of the selected image prior to the rearrangement on the screen on which the arrangement position of the selected image prior to the rearrangement is present to an arrangement position higher in rank by one, and
wherein, on the screen on which the rearrangement position is present, the arrangement unit is further configured to instruct the image display unit to move an image arranged at the rearrangement position and an image arranged at an arrangement position lower in rank than the rearrangement position to arrangement positions lower in rank by one.

5. The information processing apparatus according to claim 1,
wherein the positions which are ranked are present over a plurality of screens,
wherein the positions are sequentially and consecutively ranked over the plurality of screens, and
wherein the arrangement unit is further configured to instruct the image display unit to move the positions of the plurality of images over the plurality of screens.

6. The information processing apparatus according to claim 1, further comprising:
a rearrangement candidate image display unit configured to, upon acceptance of an instruction to change the arrangement position of the selected image and to rearrange the selected image, receive a candidate for coordinates of the rearrangement position in the arrangement area, and display the selected image at a position with the candidate coordinates,
wherein the rearrangement candidate image display unit is further configured to make the selected image to be displayed semitransparent, and, in a case where the selected image overlaps another arranged image, display a border framing the selected image.

7. The information processing apparatus according to claim 6, wherein the border framing the selected image is displayed only at a portion that overlaps the other image.

8. The information processing apparatus according to claim 6, wherein the border framing the selected image is displayed in a case where the selected image overlaps the other image in substantially the same color.

9. The information processing apparatus according to claim 1,
wherein the arrangement area in a case of rearranging the selected image to a higher rank position is an area lower in rank than the rearrangement position, and
wherein the arrangement area in a case of rearranging the selected image to a lower rank position is an area higher in rank than the rearrangement position.

10. A non-transitory computer readable medium storing a program causing a computer to execute a process for processing information, the process comprising:
displaying a plurality of images;
upon acceptance of an instruction given from an instruction unit to rearrange an image selected from among the plurality of images in an arrangement area including one of the plurality of images, rearranging the selected image at a rearrangement position arranged in the arrangement area on an image display unit; and
displaying, separately from the selected image, a marker image between an image at the rearrangement position and an image arranged lower in rank than the image at the rearrangement position in a case where the rearrangement position is lower in rank than the position of the selected image, or displaying, separately from the selected image, the marker image between the image at the rearrangement position and an image arranged higher in rank than the image at the rearrangement position in a case where the rearrangement position is higher in rank than the position of the selected image.

11. An information processing apparatus comprising:
an image display unit configured to display a plurality of images arranged at positions that are ranked; and
a marker display unit configured to, in a case of rearranging an image selected from among the plurality of images at any of the plurality of images excluding the image selected from among the plurality of images, if a rearrangement position at which the selected image is rearranged is lower in rank than a position of the selected image, display, separately from the selected image, a marker image between an image at the rearrangement position and an image arranged lower in rank than the image at the rearrangement position.

12. An information processing method comprising:
displaying a plurality of images;
upon acceptance of an instruction given from an instruction unit to rearrange an image selected from among the plurality of images in an arrangement area including one of the plurality of images, rearranging the selected image at a rearrangement position arranged in the arrangement area on an image display unit; and
displaying, separately from the selected image, a marker image between an image at the rearrangement position and an image arranged lower in rank than the image at the rearrangement position in a case where the rearrangement position is lower in rank than the position of the selected image, or displaying, separately from the selected image, the marker image between the image at the rearrangement position and an image arranged higher in rank than the image at the rearrangement position in a case where the rearrangement position is higher in rank than the position of the selected image.

13. An information processing apparatus comprising:
an image display unit configured to display a plurality of images while providing an area between the plurality of images; and
a marker display unit configured, in a case of arranging an image selected from among the plurality of images displayed on the image display unit at a position to right of a position of the selected image, display, separately from the selected image, a marker image in the area, the area being between the position where the selected image is arranged and a position where an image to right of the position where the selected image is arranged is arranged.

14. The information processing apparatus according to claim 1, wherein a same marker image is displayed regardless of which one of the plurality of images is selected.

15. The information processing apparatus according to claim 1, wherein the marker image is displayed in a case where the selected image is allowed to be rearranged at the rearrangement position.

16. The information processing apparatus according to claim 1, wherein in a case where a drop operation is input when the marker image is displayed, the selected image is rearranged at the rearrangement position, which is specified by the marker image.

* * * * *